(12) United States Patent
Forte et al.

(10) Patent No.: US 8,091,412 B2
(45) Date of Patent: Jan. 10, 2012

(54) METHOD AND DEVICES TO IDENTIFY THE PISTON IN THE COMPRESSION PHASE IN AN INTERNAL COMBUSTION ENGINE EQUIPPED WITH A GASOLINE INDIRECT ELECTRONIC INJECTION SYSTEM

(75) Inventors: Pasquale Forte, Orsenigo (IT); Stefano Bordegnoni, Orsenigo (IT); Andrea Gelmetti, Orsenigo (IT)

(73) Assignee: Eldor Corporation, S.p.A., Orsenigo (IT)

( * ) Notice: Subject to any disclaimer, the term of this patent is extended or adjusted under 35 U.S.C. 154(b) by 360 days.

(21) Appl. No.: 12/442,086

(22) PCT Filed: Sep. 17, 2007

(86) PCT No.: PCT/EP2007/008061
§ 371 (c)(1),
(2), (4) Date: Jul. 15, 2009

(87) PCT Pub. No.: WO2008/034569
PCT Pub. Date: Mar. 27, 2008

(65) Prior Publication Data
US 2009/0301177 A1     Dec. 10, 2009

(30) Foreign Application Priority Data

Sep. 20, 2006  (IT) .............................. MI2006A1783

(51) Int. Cl.
*G01M 15/04*     (2006.01)
(52) U.S. Cl. .................. 73/114.27; 73/35.06; 73/114.67
(58) Field of Classification Search ................. 73/35.03, 73/35.06, 114.26, 114.27, 114.28, 114.67
See application file for complete search history.

(56) References Cited

U.S. PATENT DOCUMENTS

| | | |
|---|---|---|
| 6,246,952 B1 | 6/2001 | Honda |
| 6,408,242 B1 | 6/2002 | Tozzi |
| 6,848,421 B1 | 2/2005 | Karau et al. |
| 7,971,476 B2 * | 7/2011 | Forte et al. ................. 73/114.67 |
| 2001/0052336 A1 | 12/2001 | Tanaya et al. |
| 2010/0064772 A1 * | 3/2010 | Forte et al. .................... 73/35.08 |

FOREIGN PATENT DOCUMENTS

EP     1 092 968 A1     4/2001

* cited by examiner

*Primary Examiner* — Eric S McCall
(74) *Attorney, Agent, or Firm* — Greer, Burns & Crain, Ltd.

(57) ABSTRACT

The invention relates to the field of method and devices therefore for identifying which cylinder is in the compression phase in a gasoline indirect electronic injection internal combustion engine.
The present invention develops over various phases, measuring the signal of the ionisation current of each cylinder in which the piston is located at the top dead centre, registering the average value thereof and comparing it with a predetermined value.

2 Claims, 3 Drawing Sheets

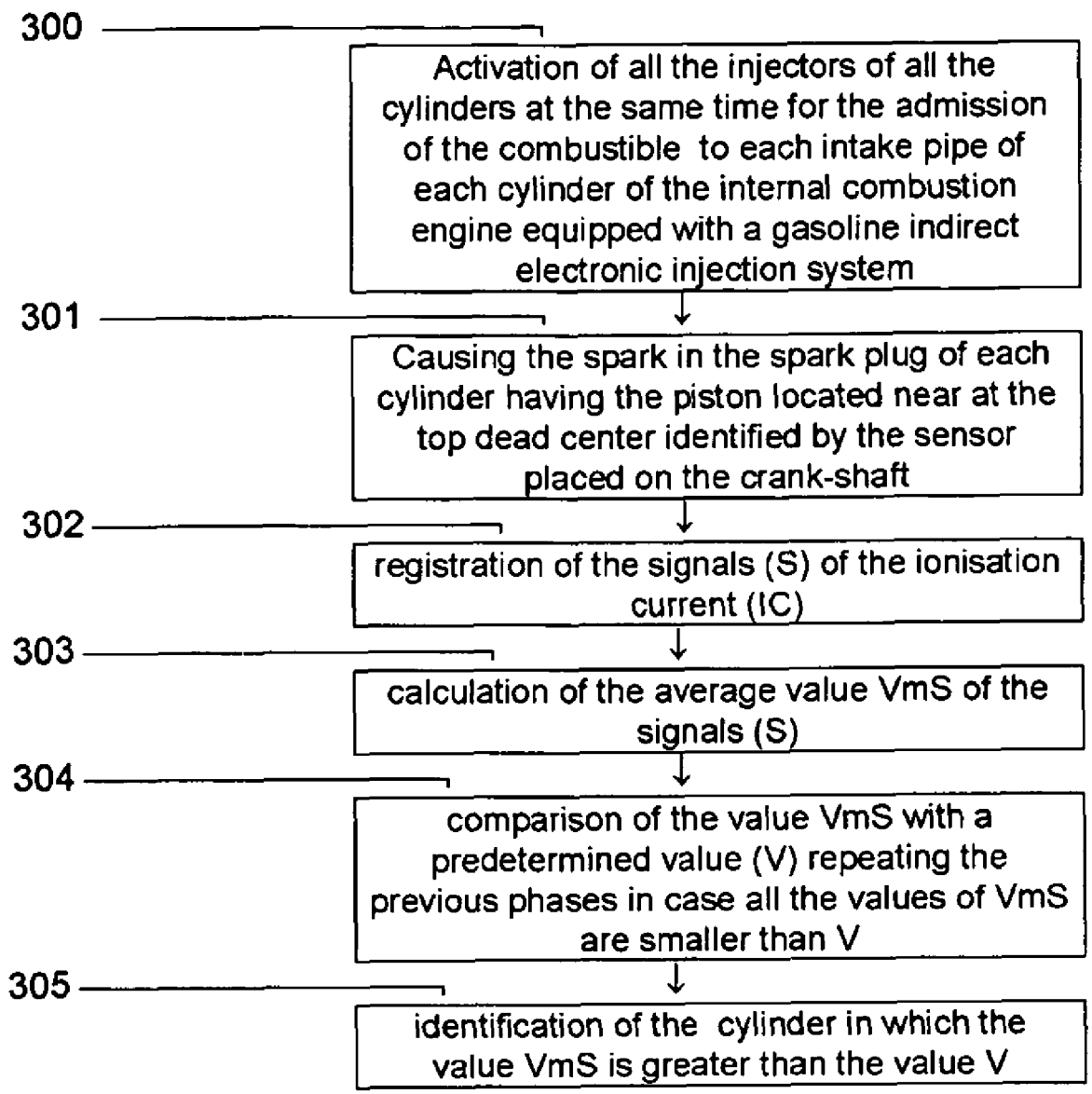

METHOD AND DEVICES TO IDENTIFY THE PISTON IN THE COMPRESSION PHASE IN AN INTERNAL COMBUSTION ENGINE EQUIPPED WITH A GASOLINE INDIRECT ELECTRONIC INJECTION SYSTEM

This application is a U.S. National Phase under 35 U.S.C. §371 of International Application No. PCT/EP2007/008061, filed Sep. 17, 2007, which claims priority to Italian Patent Application No. MI2006A001783, which is hereby incorporated by reference in its entirety.

TECHNICAL FIELD

The present invention relates to a method and devices for identifying which cylinder is in the compression phase.

BACKGROUND ART

The methods and devices currently utilised and available on the market for phase identification in an internal combustion engine, in particular for identifying which cylinder thereof is in the compression phase, are based on the use of sensors positioned on the cam shaft.

This known method has various drawbacks. The most relevant drawbacks are constituted of possible sensor functioning failure.

A further method is likewise known for phase identification in of an internal combustion engine which involves forcing combustion failure. This method is based on the failure of the mixture ignition in a determined cylinder.

The said method presents the drawback that it determines an anomalous functioning of the said internal combustion engine with damaging effects for the said engine and for the functioning of the vehicle in which the said engine is mounted.

DISCLOSURE OF INVENTION

The aim of the present invention is to identify a method, and the devices therefore, for identifying, in an accurate and reliable manner, within the third engine turn which cylinder of an internal combustion engine, equipped with a gasoline indirect electronic injection system, has the piston in the compression phase, thereby overcoming the drawbacks of the known methods and devices.

The present invention makes advantageous use of the ionisation current developed during the combustion of the mixture in each cylinder of an internal combustion engine.

This ionisation current is measured by a Control Unit (4), commonly used for the management of the said internal combustion engines.

The aims and advantages will better emerge in the description that follows and the drawings enclosed, which illustrate, purely in the form of a non-limiting example, an internal combustion engine, equipped with a gasoline indirect electronic injection system, with a plurality of cylinders:

BRIEF DESCIPTION OF DRAWING

FIG. 3 illustrates, schematically, the flow chart relating to the method according to the invention in question.

DETALED DESCRIPTION OF INVENTION

Figure 1:
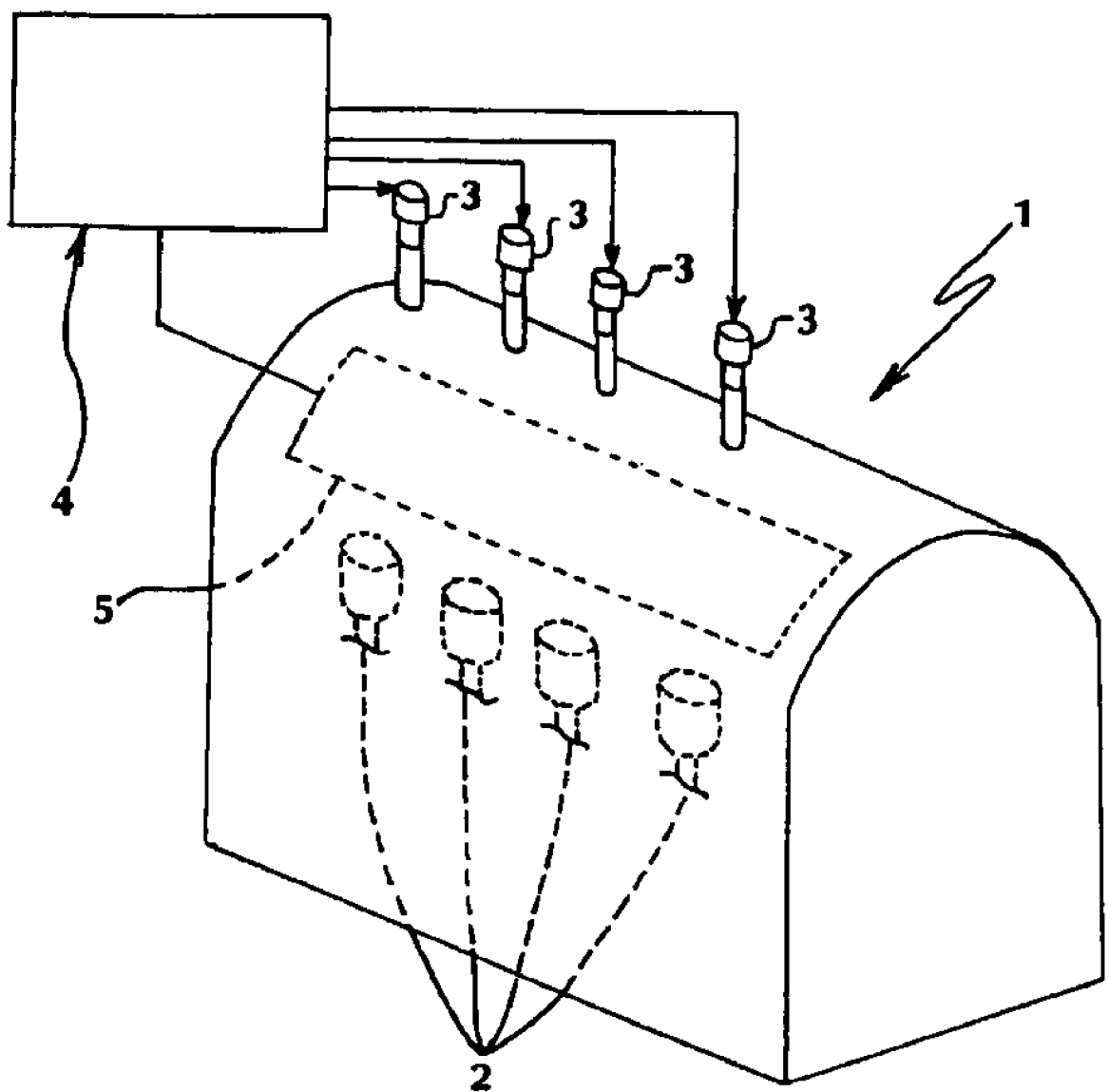
FIG. 1 illustrates a schematic view of an engine which utilises the method, and the Control Unit in which the means that actuate the invention in question are housed (the said means are not shown graphically)

With reference to FIG. 1, (1) indicates an internal combustion engine, equipped with a gasoline indirect electronic injection system, as a whole, fitted with one or more cylinders (2), one or more pistons (3), a device (5) positioned on top of each cylinder which, in addition to creating—by means of the spark plug—the spark necessary to realise the combustion inside the cylinder, releases the ionisation current, which is indispensable to actuate the method in question. This figure also shows a Control Unit (4). The devices for actuating the method (not shown graphically) likewise are positioned in the said Control Unit.

Figure 2:
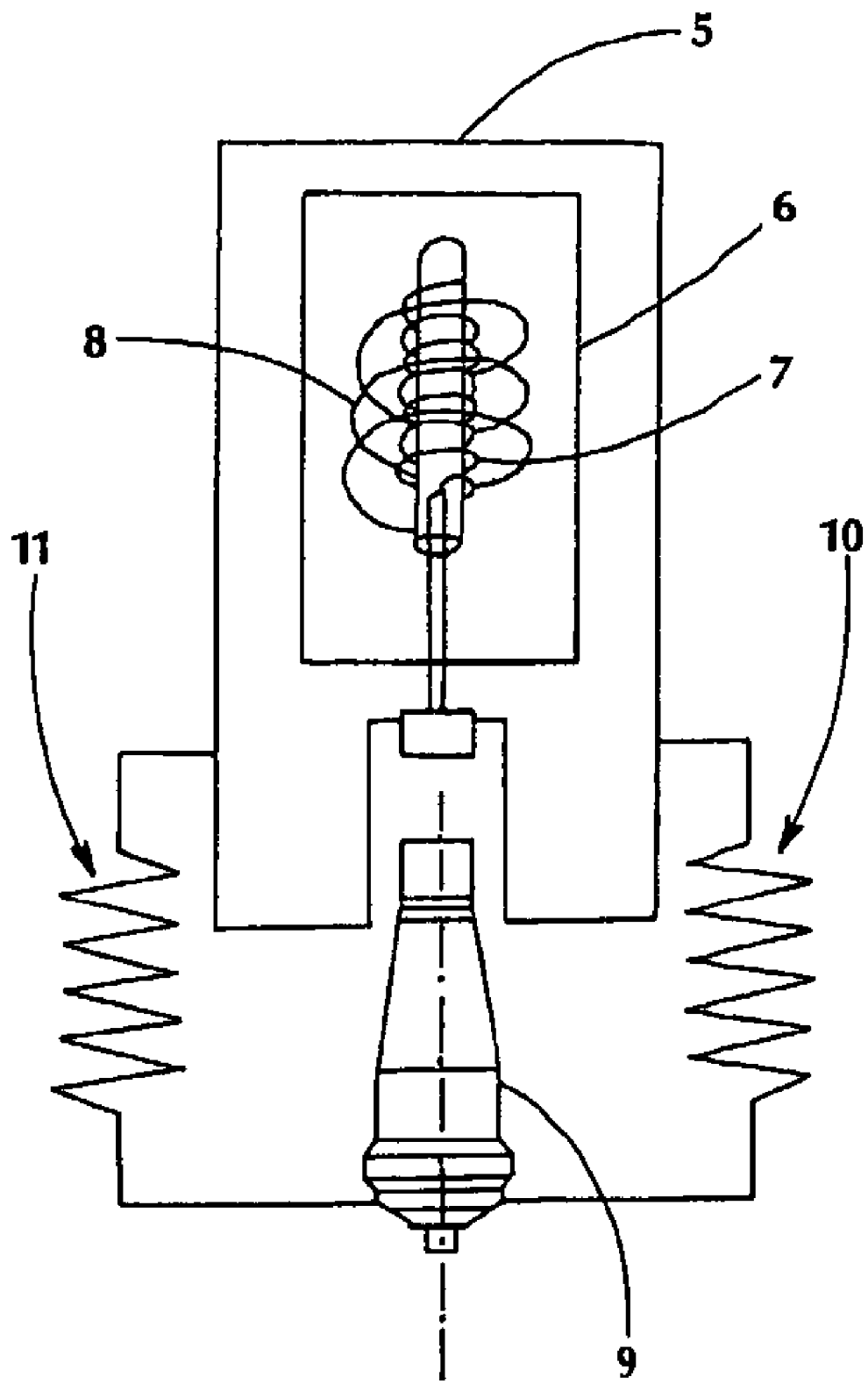
FIG. 2 illustrates the part of the device in question in the present invention, located on top of the cylinders which, in addition to creating the spark necessary to realise the combustion inside the cylinder, produces the ionisation current indispensable for actuating the method in question.

With reference to FIG. 2, the said figure indicates the part of the device in question in the invention, positioned on top of the cylinders which, in addition to creating the spark necessary to realise the combustion inside the engine, produces the ionisation current, which is indispensable to implement the method in question. This part of the device is constituted of a coil (6) and a spark plug (9). The coil (6) is fitted with a primary circuit (7) and a secondary circuit (8). The two elements (5) and (9) are mutually connected by a polarisation circuit (10) and an acquisition circuit (11).

With reference to FIG. 3, the said figure indicates a flow chart which schematically illustrates the method in question in the invention. This method develops over various phases, to each of which the electronic device therefore corresponds, the said device being identified with the same reference number as the respective number of the method phase.

In a first phase (300) in which the engine starter makes the engine turn, all the injectors of all the cylinders are activated at the same time to have the fuel admitted to each intake pipe of each cylinder (2) of the engine (1).

In the following phase of the method (301), the spark plug (9) causes a spark in each cylinder (2) whose piston (3) is located near the top dead centre regardless of the fact that the piston is at the end of the compression or at the end of the exhaust phases as identified by the sensor placed on the crankshaft. Said sensor is the sensor ordinarily placed on the crankshaft of the motor vehicles on the market having electronic injection.

In phase (302) the registration is effected, from the end of the spark produced by the spark plug (9)—as mentioned in the previous phase—of the ionisation current (IC) signals produced in the secondary circuit (8) of the device (5) of each cylinder (2) whose piston (3) is near at the top dead centre. These signals are called, in the present invention, (S).

The method continues with a subsequent phase (303) consisting of the calculation of the average value of the signals S produced during the previous phase (302). This average value is called, in the present invention, VmS.

The subsequent phase (304) of the method relates to the comparison of each average value VmS registered in the previous phase (303) and a predetermined value, called in the present invention, V repeating the previous phases of the method in case all the values VmS are smaller than V.

The method concludes with phase 305. In the said phase, each cylinder (2) of the internal combustion engine (1) in which the average value VmS is greater than the predetermined value V is identified. In conventional engines, the cylinder identified in the said phase (305) is the sole cylinder in which the piston is in the compression phase.

The description above and the tables enclosed illustrate an embodiment of the present invention and constitute a non-limiting example thereof within the scope of protection of the claims that follow.

The invention claimed is:

1. A method for identifying a piston in compression phases within a third engine turn of an internal combustion engine equipped with a gasoline indirect electronic injection system having one or more cylinders, one or more pistons, a Control Unit for said engine, and a device to produce the ionisation current (IC) located on top of each cylinder of said engine comprising a coil having a primary circuit and a secondary circuit, a spark plug, a polarisation circuit and an acquisition circuit, wherein said method comprises the following phases:
   activating all injectors of all the cylinders at the same time admitting combustible to each intake pipe of each cylinder of the engine;
   causing the spark in the spark plug in each cylinder whose piston is located near a top dead center as identified by a sensor placed on a crank-shaft;
   registering, from the end of the spark produced by the spark plug, the signals of the ion current produced and detected in the secondary circuit of the device of each cylinder whose piston is at the top dead centre (S);
   calculating the average value of the signals S (VmS);
   comparing the values VmS with a predetermined value (V) and repeating the previous phases of the method in case all the values of VmS are smaller than V;
   identifying the cylinder of the engine in which the value VmS is greater than the predetermined value V.

2. A device for identifying a piston in compression phases within a third engine turn of an internal combustion engine equipped with a gasoline indirect electronic injection system having one or more cylinders, one or more pistons, a Control Unit for said engine, and a device to produce the ionisation current (IC) located on top of each cylinder of said engine, wherein said device comprises:
   electronic means suitable for activating all injectors of all the cylinders at the same time for admitting fuel to each intake pipe of each cylinder of the engine;
   electronic means suitable for causing the spark in the spark plug in each cylinder whose piston is located near a top dead centre as identified by a sensor placed on a crank-shaft;
   means suitable for registering, from the end of the spark produced by the spark plug, the signals of the ion current produced and detected in the secondary circuit of the device of each cylinder whose piston is at the top dead centre (S);
   electronic means suitable for calculating the average value of the signals S (VmS);
   electronic means suitable for comparing the values VmS with a predetermined value (V) and to repeat the previous phases in case all the values of VmS are smaller than V;
   and electronic means suitable for identifying the cylinder of the engine in which the value VmS is greater than the predetermined value V.

* * * * *